(12) United States Patent
Subiakto

(10) Patent No.: US 10,347,144 B2
(45) Date of Patent: Jul. 9, 2019

(54) FIX-SMART WEARABLE LEARNING DEVICE WITH ADJUSTABLE FINGER RING

(71) Applicant: Edward Subiakto, Jakarta (ID)

(72) Inventor: Edward Subiakto, Jakarta (ID)

( * ) Notice: Subject to any disclaimer, the term of this patent is extended or adjusted under 35 U.S.C. 154(b) by 149 days.

(21) Appl. No.: 15/396,523

(22) Filed: Dec. 31, 2016

(65) Prior Publication Data

US 2017/0330471 A1 Nov. 16, 2017

(51) Int. Cl.
| | |
|---|---|
| *G06F 3/16* | (2006.01) |
| *G09B 5/06* | (2006.01) |
| *G06F 3/0481* | (2013.01) |
| *G06F 3/0482* | (2013.01) |
| *G06M 1/22* | (2006.01) |
| *G09B 19/00* | (2006.01) |
| *G09B 19/06* | (2006.01) |
| *G10L 21/0208* | (2013.01) |
| *G11B 31/00* | (2006.01) |
| *G11B 33/02* | (2006.01) |
| *G06F 1/16* | (2006.01) |
| *G06M 1/02* | (2006.01) |
| *G06F 17/28* | (2006.01) |
| *G10L 15/00* | (2013.01) |

(52) U.S. Cl.
CPC .......... *G09B 5/065* (2013.01); *G06F 1/163* (2013.01); *G06F 1/1626* (2013.01); *G06F 3/0482* (2013.01); *G06F 3/04817* (2013.01); *G06F 3/165* (2013.01); *G06M 1/02* (2013.01); *G06M 1/22* (2013.01); *G09B 5/062* (2013.01); *G09B 19/00* (2013.01); *G09B 19/06* (2013.01); *G10L 21/0208* (2013.01); *G11B 31/006* (2013.01); *G11B 33/025* (2013.01); *G06F 17/289* (2013.01); *G10L 15/00* (2013.01)

(58) Field of Classification Search
CPC ....... G06F 1/163; G06F 1/1615; G06F 1/1626
See application file for complete search history.

(56) References Cited

U.S. PATENT DOCUMENTS

| | | | | |
|---|---|---|---|---|
| 2,572,784 A * | 10/1951 | Van Veen | ............. | G06M 1/041 235/112 |
| 4,954,817 A * | 9/1990 | Levine | .................... | G06F 3/014 345/156 |
| 5,088,072 A * | 2/1992 | Fitzmorris | ............. | G04B 37/12 368/110 |
| 5,813,766 A * | 9/1998 | Chen | .................... | A44C 9/0053 340/407.1 |
| 5,832,296 A * | 11/1998 | Wang | .................... | G06F 3/0338 340/539.22 |
| 6,065,971 A * | 5/2000 | Lennon | ................ | A44C 9/0053 434/188 |

(Continued)

*Primary Examiner* — Jason Skaarup
(74) *Attorney, Agent, or Firm* — Daniel N. Smith

(57) ABSTRACT

An innovative method of learning with a wearable device with an adjustable and swivel ring band for placement on a user's finger for easy operation with one thumb. The device contains a voice recorder, a digital audio/video player (mp3/mp4 player), a microphone, and built-in speakers, for simultaneous recording on previously recording audio files. The device also contains four separate digital tally counters for complex single and group counting. The device enhances and rectifies a user's learning capability by recording, listening, reviewing, and repeating what is being studied for educational and religious purposes, entitled the Fix-smart™.

17 Claims, 6 Drawing Sheets

(56) References Cited

U.S. PATENT DOCUMENTS

| | | | | |
|---|---|---|---|---|
| 6,297,808 B1* | 10/2001 | Yang | | G06F 3/03549 |
| | | | | 345/167 |
| 6,778,380 B2* | 8/2004 | Murray, Jr. | | H01H 9/0235 |
| | | | | 340/12.55 |
| 6,783,822 B1* | 8/2004 | Faouaz | | A47C 16/04 |
| | | | | 428/192 |
| 7,578,070 B1* | 8/2009 | Lynch | | G01B 3/34 |
| | | | | 33/514.1 |
| 7,703,937 B2* | 4/2010 | Shirey | | A44C 9/0053 |
| | | | | 362/103 |
| 8,090,418 B2* | 1/2012 | Thiel | | H04B 1/385 |
| | | | | 455/575.2 |
| 8,235,294 B2* | 8/2012 | Miller | | G06K 7/0004 |
| | | | | 235/472.02 |
| 8,260,384 B2* | 9/2012 | Wulff | | A45F 5/00 |
| | | | | 224/267 |
| 8,570,273 B1* | 10/2013 | Smith | | G06F 3/0338 |
| | | | | 345/156 |
| 8,605,036 B1* | 12/2013 | Kelly | | G06F 3/014 |
| | | | | 345/156 |
| 8,681,101 B1* | 3/2014 | Haney | | G06F 3/033 |
| | | | | 345/161 |
| 9,155,377 B2* | 10/2015 | Wangercyn, Jr. | | H04B 1/385 |
| 9,332,581 B2* | 5/2016 | Aldriedge | | G06F 3/014 |
| 9,335,790 B2* | 5/2016 | Stotler | | G06F 1/163 |
| 9,462,340 B1* | 10/2016 | Mathurin | | H04N 21/234336 |
| 2003/0086521 A1* | 5/2003 | Rana | | A44C 23/00 |
| | | | | 377/3 |
| 2004/0051694 A1* | 3/2004 | Backman | | G06F 3/014 |
| | | | | 345/156 |
| 2004/0190383 A1* | 9/2004 | Marcucelli | | G04B 37/1433 |
| | | | | 368/278 |
| 2006/0001646 A1* | 1/2006 | Hai | | G06F 3/014 |
| | | | | 345/156 |
| 2006/0164383 A1* | 7/2006 | Machin | | G05G 9/047 |
| | | | | 345/156 |
| 2008/0182547 A1* | 7/2008 | Glover | | H04M 11/04 |
| | | | | 455/404.1 |
| 2012/0293410 A1* | 11/2012 | Bell | | G06F 3/014 |
| | | | | 345/158 |
| 2013/0146625 A1* | 6/2013 | Karle | | A45F 5/00 |
| | | | | 224/217 |
| 2015/0185874 A1* | 7/2015 | Raffa | | G06F 3/0346 |
| | | | | 345/158 |
| 2015/0220109 A1* | 8/2015 | von Badinski | | G01P 15/00 |
| | | | | 340/539.12 |
| 2015/0277559 A1* | 10/2015 | Vescovi | | G06F 3/014 |
| | | | | 345/173 |
| 2015/0373443 A1* | 12/2015 | Carroll | | H04B 1/385 |
| | | | | 381/364 |
| 2016/0034742 A1* | 2/2016 | Kim | | H04B 1/385 |
| | | | | 382/124 |
| 2016/0104355 A1* | 4/2016 | Alexander | | G08B 25/009 |
| | | | | 340/692 |

* cited by examiner

FIX-SMART WEARABLE LEARNING DEVICE WITH ADJUSTABLE FINGER RING

CROSS REFERENCE TO RELATED APPLICATION

This application claims priority to Indonesia Patent No. P00201603229, filed on May 16, 2016, the contents of which are incorporated herein by reference.

FIELD OF THE INVENTION

The present invention relates to a finger wearable device, the Fix-Smart™, with an adjustable and swivel ring band, the device helps a user enhance and rectify his or her learning capabilities with an innovative method of learning through recording, listening, reviewing, repeating, and recording along or over audio and video files.

BACKGROUND OF INVENTION

With recent advances in technology, digital voice recorders and digital audio and video players (mp3 and mp4 players) are designed in miniature and micro packaging making them very convenient to be carried around everywhere. Their manufacture is very inexpensive. Digital voice recorders and digital audio and video players (mp3 and mp4 players) may be designed and combined in the form of a bracelet, a pen, a key chain, a clip, or a pendant.

Furthermore, a large variety of devices have been manufactured to measure time, from ring watches, to wrist watches, and digital time-keepers in mobile phones. With the popularity of wrist watches, the wrist watch location on the arm has become a paradigm or mind set when one needs to look for time. Use of the subject invention to learn through recording, listening, reviewing, and repeating audio and video files will become second nature to a user with it's small size and availability, just as the small size and availability permits the use of a wristwatch to become a user's second nature to determine the time.

Few prior art devices have been designed for placement and use over a user's finger. Furthermore, few prior art devices have been design to help religious counts during prayer activities.

U.S. Pat. No. 2,572,784 discloses a tally or counter and particularly to a small handy and usually manually operated counter having a plurality of digit wheels positioned closely adjacent each other on the same axis.

U.S. Pat. No. 4,954,817 discloses a miniaturized finger worn X-Y graphic interface device. When used in conjunction with a conventional keyboard, the computer-human interface becomes faster, more natural, efficient and intuitive.

U.S. Pat. No. 5,088,072 discloses an athletic performance measuring device which can be conveniently worn on the user's finger. The device can provide a variety of functions such as lap counting and timing. An actuator is provided in the form of a thumb switch, to allow the counter/timer to be held and operated by one hand, without disrupting the athlete's performance.

U.S. Pat. No. 5,813,766 discloses a finger temperature indicating ring for wearing around a finger to measure and indicate the finger temperature of the wearer.

U.S. Pat. No. 5,832,296 discloses a wearable universal user interface device with a variety of electronic apparatus. The interface device includes various sensors, such as a temperature sensor, pressure sensor, and a two-dimensional quadrant force sensor. The interface device also includes processing circuitry, a wireless transmitter, and an optional receiver. In the preferred embodiment, the interface device is in the form of a ring adapted to be worn on the finger of a user. The device is operated by the wearer's fingers and thumb.

U.S. Pat. No. 6,297,808 discloses a hand controller device that includes a casing on the outside which are positioned a finger hole, a track ball, a display screen, and an interface, and on the interior of which are batteries and any other necessary circuitry, depending on the function of the controller. The casing includes one or more finger holes so that the device can be worn like a ring.

U.S. Pat. No. 6,065,971 discloses a finger ring counting device enables persons to accurately count prayers while saying the Rosary. The counting device is embodied in a ring, and on which can be inconspicuously worn on the hand, and on which there are a number of beads which are manually movable around the circumference of the ring for counting.

U.S. Pat. No. 6,778,380 discloses a television mute ring with a hollow C shaped finger ring housing. The housing contains a standard electronics and infrared (IR) transmitting light emitting diode (LED) associated with activating the mute function of a standard television.

U.S. Pat. No. 6,783,822 discloses a Muslim prayer counter comprising a short upper edge and a parallel short lower edge with parallel side edges there between, a rug having an exposed planar upper surface and a lower surface adapted to be supported on a floor; a counter secured to the upper surface of the rug adjacent the upper edge in proximity to one side edge thereof; a switch located on the upper surface of the rug mid-way between side edge; a battery secured to the lower surface of the rug adjacent the upper in proximity to the counter, the battery including an electrical lines coupling the counter, the battery, and the switch.

U.S. Pat. No. 7,578,070 discloses a digital ring sizing device that includes a cylinder removably positioned directly about the selected user finger, and a mechanism for determining a ring size of the selected user finger.

U.S. Pat. No. 7,703,937 discloses a reading light ring that includes a battery powered LED as the source of illumination. The reading light ring is intended to be worn on the index finger and operated by means of a thumb operated switch located on the side of the ring.

U.S. Pat. No. 8,090,418 discloses an over-the-ear communications headset for hands-free communication with mobile phones and similar devices, the headset being convertible to a ring configuration for wearing on the finger as a communications device and as jewelry.

U.S. Pat. No. 8,235,294 discloses a Multi-Mode Ring Scanner (MMRS).

U.S. Pat. No. 8,260,384 discloses a wearable mount configured to couple to a mobile device, the coupling making the mobile device wearable at a worn location, wherein a set of functionalities of the mobile device corresponds to the worn location.

U.S. Pat. No. 8,570,273 discloses an input device that includes a band that is configured to at least partially encircle a digit of a hand. A connection member suspends a platform above an exterior surface of the band. The platform is configured to be manipulated by a second digit of the hand. A processor is configured to determine event data based on the manipulation of the platform. The event data is transmitted via a radio frequency (RF) transmitter in a control signal to the communicatively coupled remote processor.

U.S. Pat. No. 8,605,036 discloses a finger control and data entry device that includes a retaining element adapted to fit on at least one finger of an operator.

U.S. Pat. No. 8,681,101 discloses a finger-mounted input device with an integrated accelerometer that functions as a computer input device capable of transmitting manipulation signals controlled by a touch pad, track ball, or joystick and switching signals controlled by buttons.

U.S. Pat. No. 9,155,377 discloses a finger loop for use with a portable electronic device case, housing or enclosure.

U.S. Pat. No. 9,332,581 discloses a wearable device that includes a single ring which fits over the user's thumb or other finger. The wearable device interfaces with specialized software to provide two primary functions. First, the ring in combination with specialized software maps the rest of the user's hand in order to take input from fingers that are not currently wearing a device. Two contact points touch the screen of a device and conduct the electric current along the user's skin to interact with a capacitive screen. Second, the ring acts as a broker to connect a paired device with a touchscreen device. Between the twin contacts is a color sensor. The software on the touchscreen device displays a color to indicate how the devices should establish their connection.

U.S. Pat. No. 9,335,790 discloses a wearable computing device can have a processor, a memory, and a display so operatively coupled to the processor and the memory as to display an output therefrom. The processor and the memory can be positioned in a resiliently flexible body. The resiliently flexible body can include a first end and an opposed second end, a first edge and an opposed second edge, wherein the first and the second edges extend between the first end and the opposed second end. The body can also have a wearer-engagement portion positioned between the first end and an intermediate region, wherein the finger-engagement portion of the resiliently flexible body circumferentially so extends around a longitudinally extending axis positioned parallel to the first end and spaced apart from the resiliently flexible body as to define an open interior region, wherein the interior region of the wearer-engagement portion defines an inner surface extending between the first edge and the second edge and between the first end and the intermediate region, wherein the wearer engagement portion further defines an outer surface positioned outward of the interior region and opposite the interior surface. A display portion of the body can be positioned between the intermediate region and the second end, wherein the display is positioned in the display portion on a same side of the resiliently flexible body as the outer surface of the wearer-engagement portion. A user input device can be positioned opposite the interior surface and outward of the interior region, and between the first end and the display portion.

U.S. Patent Publication No. 2003/0086521 discloses an electronic hand held rosary apparatus with beads counting digital mechanism. The apparatus stores counts of various Muslim/non-Muslim prayers/recitations in separately identifiable registers, with keys or by vocal means. The goal is to facilitate the worshipper in knowing the specific counts of prayers made.

U.S. Patent Publication No. 2004/0051694 discloses a portable device for inputting control signals to a peripheral unit. The device comprises a holding member designed to be attached to a first hand of a user of the device so as to retain the device in a predetermined manner on said first hand. At least a first input member is arranged on said holding member. The first input member is arranged for inputting signals to the peripheral unit in order to perform the same or a similar function as a joystick or as the movement of a standard computer mouse. Said input member is arranged on said holding member such that when the holding member is arranged as intended on said first hand, the first input member is arranged within a predetermined area of said first hand.

U.S. Patent Publication No. 2004/0190383 discloses a housing including a sleeve portion having an interior bend configured to receive a knuckle on a wearer's finger such that the housing can be securely mounted on the wearer's finger. The housing also includes a cavity configured to receive an electronics module therein, and a control access configured to align with controls of the electronics module such that the wearer can operate the electronics module when contained in the recess. The housing may include an electronics module such a watch or medical monitoring device.

U.S. Patent Publication No. 2006/0001646 discloses a finger worn and operated input device includes a housing having a "C" shaped cross section, a control portion disposed on the housing, and a processing circuit coupled to the control portion.

U.S. Patent Publication No. 2006/0164383 discloses a hand-worn controller consisting of a housing having a central opening sized to permit the controller to be worn as ring on the index finger of a human hand. A joystick lever projects outwardly from said housing and is positioned to be manipulated by the user's thumb. The joystick operates on or more control devices, such as switches or potentiometers, that produce control signals. A wireless communications device, such as a Bluetooth module, mounted in said housing transmits command signals to a remote utilization device which are indicative of the motion or position of said joystick lever.

U.S. Patent Publication No. 2008/0182547 discloses a wireless transceiver worn about the hand, the transceiver adapted to initiate an outbound telephone call on a compatible mobile telephone responsive to actuating a button on the transceiver for a predetermined interval, the outbound telephone call is placed to a predetermined emergency telephone number, the transceiver transmitting audio to the mobile telephone.

U.S. Patent Publication No. 2012/0293410 discloses an input device including a wearable ring shaped component that is supported on a finger and located between a finger tip and a knuckle of the wearer. The wearable component comprises a touch pad device that is located on an outward surface of the wearable ring shaped component. The touch pad device is contacted to provide an input command. The wearable component includes a transmitter to transmit the input command.

U.S. Patent Publication No. 2013/0146625 discloses a flexible ring that can be attached to a portable electronic device, or a case of a portable electronic device, to allow a user to insert their finger to hold the case. The flexible ring would be able to swivel, relative to the phone, for comfort for a user's finger, such as an index or ring finger, to easily slide through to help the user make and retain a good grip on the mobile device.

U.S. Patent Publication No. 2015/0185874 discloses a wearable device that includes a processor having memory and communicatively coupled to a plurality of display areas; and an orientation sensing module communicatively coupled to the processor to determine at least one of an orientation and a location of at least one of the plurality of display areas with respect to a point of view of a user; wherein the processor provides a function for at least one of the plurality of display areas based on the determined at least one of the orientation and the location of at least one of the plurality of display areas by the orientation sensing module.

U.S. Patent Publication No. 2015/0220109 discloses a wearable computing device (WCD) in the form of a ring that can be worn on the finger of a human user.

U.S. Patent Publication No. 2015/0277559 discloses a finger-ring-mounted touchscreen that includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

U.S. Patent Publication No. 2015/0373443 discloses a mobile communication device configured to be worn on an index finger of a user's hand. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

U.S. Patent Publication No. 2016/0034742 discloses a ring-type terminal including a main body configured to be placed on and surround a user's finger and including an insertion region in which the finger is inserted; a fingerprint sensor provided on at least one region of an inner circumferential surface of the main body and configured to recognize a fingerprint of the finger; a guide module provided on the inner circumferential surface such that the finger comes in contact with the fingerprint sensing module while the finger is inserted in the insertion region; and a controller configured to execute a function based on the fingerprint sensed by the fingerprint sensing module.

U.S. Patent Publication No. 2016/0104355 discloses an alarm module devices such as a wearable article including a base portion and an upper portion covering the base portion, wherein the base portion and the upper portion cooperating to define a compartment. The device can further include at least one acoustical transducer, and a printed circuit board (or other suitable activation circuitry) disposed in the compartment including circuitry for actuating the at least one acoustical transducer. The device can further include a power source in selective electrical communication with the at least one acoustical transducer by way of the printed circuit board.

French Patent No. 2648330, discloses an electronic system for counting rosary beads for Islamic prayers with means for memorizing and totaling the counts. The system includes a microcontroller having memory to compare various parameters; a display which visualizes the number of beads counted, the time, the date, and the alarm times; an audible element which is triggered as a function of the values introduced, and an entry interface which is compared with those counts memorized.

Brazil Patent No. 9907593 discloses a digital rosary device with a micro-controlled electronic chip. The device contains a recorded program to perform rosary functions which are controlled by intelligent command buttons.

Indonesia Patent No ID 0 000 798 S and WIPO Publication No. 2008/029380 disclose a digital tasbih ring that helps with daily activities. The ring is equipped with a tasbih counter, an indicator function for every-33 or every-100 time count during contemplation and 5-time praying reminder alarm, a praying-step counter for fasting month praying, a counter for more detailed praying activities, a compass, a Makkah-course, a digital clock, a stopwatch, a flashlight, and a digital audio player.

Indonesia Patent ID 0 000 826 S and WIPO Publication No. 2009/144689 disclose a digital tally counter for counting numbers individually as well as in groups to support religious activities, data collections, and inventories. The digital tally counter is equipped with a mini torch light, a mini projector, and a laser light. For counting operations, the digital tally counter has a push button for comfort to avoid finger fatigue and an infrared (IR) proximity sensor or close range detection sensor for counting in close range without touching the digital tally counter.

Indonesia Patent IDP 0000373335 B discloses a digital tally counter with a rubber stamp. The device is fitted to a user's finger for the purpose of counting number in multi-groups with the ability to stamp and count numbers at the same time to obtain thorough data collections for market segment surveys, inventories, laboratory works, and religious prayers. When not in use, the rubber stamp device can be transformed to a torch light and a laser light.

None of the prior art discloses a device that enhances and rectifies a user's learning capabilities, or "innovative method of learning". The subject invention incorporates this method by allowing a user to study any type of subject by way of recording, listening, reviewing, and repeating what is being studied, the Fix-Smart™. For example, using the subject invention, a user can listen to a lecturer or read a book, and simultaneously take audio notes by recording the key points, then listening and reviewing by playback, and repeating them for easier memorization.

Furthermore, a user may incorporate this device into religious practices. For example, a Muslim user may use the subject invention to self-teach himself or herself by repetitively practicing from a pre-recorded Salah (Muslim ritual prayer), recording his or her own voice, and listening to the playback for memorization and making corrections on pronunciations. The subject invention also contains digital tally counters for doing Dhikr, or short prayers which are recited repetitively.

The subject invention will allow a user to carry out learning activities, religious activities, and counting activities with a small and practical device in the form of a finger ring. The device is not lost easily, is convenient to carry around everywhere, and is ready to use at any time.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen executable software, wherein each user interface screen displays menu icons; a plurality of toggle buttons on the housing for moving and selecting a plurality of menu icons on a plurality of user interface screen, wherein selection of an icon activates the executable software to control one or more of the microphone, the digital voice recorder, the digital audio player, the digital video player, the audio speaker, the wireless internet antenna, the radio antenna, a memory card inserted into the slot, the four digital tally counters, the torch light, and the laser light; wherein the plurality of toggle buttons are operated by one hand of the user; further wherein the user engages the microphone, the digital voice recorder, the digital audio player, the audio speaker, and executable voice recognition with noise cancellation software to record the user's voice over previous audio file to create a new audio file; and wherein the user engages the digital audio player and the audio speaker to listen to the new audio file, wherein the user engages at least one of the four digital tally counters to count along with the audio file.

The subject invention discloses a wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen executable software, wherein each user interface screen displays menu icons; a plurality of toggle buttons on the housing for moving and selecting a plurality of menu icons on a plurality of user interface screen, wherein selection of an icon activates the executable software to control one or more of the microphone, the digital voice recorder, the digital audio player, the digital video player, the audio speaker, the wireless internet antenna, the radio antenna, a memory card inserted into the slot, the four digital tally counters, the torch light, and the laser light; wherein the plurality of toggle buttons are operated by one hand of the user; further wherein the user engages the microphone, the digital voice recorder, the digital audio player, the audio speaker, and executable speech recognition with translation software to convert the user's voice into another language chosen in substantial real time to create a translated audio file; and wherein the user engages the digital audio player and the audio speaker to listen to the translated audio file.

The subject invention discloses a wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen executable software, wherein each user interface screen displays menu icons; a plurality of toggle buttons on the housing for moving and selecting a plurality of menu icons on a plurality of user interface screen, wherein selection of an icon activates the executable software to control one or more of the microphone, the digital voice recorder, the digital audio player, the digital video player, the audio speaker, the wireless internet antenna, the radio antenna, a memory card inserted into the slot, the four digital tally counters, the torch light, and the laser light; wherein the plurality of toggle buttons are operated by one hand of the user; further wherein the audio, video, image, text, and data files may be downloaded from Internet and can cover any subject for studying and religious practices. The learning device software or files may be downloaded or accessed through on-line portals or downloadable software applications on personal computers, laptop computers, smartphones, tablet devices, or other computer workstations connected to the Internet through a wired or wireless connection such as Wifi or Bluetooth.

The subject invention discloses a wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen executable software, wherein each user interface screen displays menu icons; a plurality of toggle buttons on the housing for moving and selecting a plurality of menu icons on a plurality of user interface screen, wherein selection of an icon activates the executable software to control one or more of the microphone, the digital voice recorder, the digital audio player, the digital video player, the audio speaker, the wireless internet antenna, the radio antenna, a memory card inserted into the slot, the four digital tally counters, the torch light, and the laser light; wherein the plurality of toggle buttons are operated by one hand of the user; further wherein the user inserts a memory card containing at least one audio file which is converted from a Printed Book by using a book scanner or text-to-speech software; and wherein the user engages the digital audio player, the audio speaker, and the external display screen to simultaneously listen to the converted audio file through the audio speaker.

The subject invention discloses a wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen executable software, wherein each user interface screen displays menu icons; a plurality of toggle buttons on the housing for moving and selecting a plurality of menu icons on a plurality of user interface screen, wherein selection of an icon activates the executable software to control one or more of the microphone, the digital voice recorder, the digital audio player, the digital video player, the audio speaker, the wireless internet antenna, the radio antenna, a memory card inserted into the slot, the four digital tally counters, the torch light, and the laser light; wherein the plurality of toggle buttons are operated by one hand of the user; further wherein the user inserts so called Micro-Book™ in the form of a MicroSD card that is produced by converting a Printed Book or other type of printed materials, such as newspaper, magazine, or thesis, or alike, into an audio form by utilizing a narrator or narrators in a recording studio with addition of video, image, and text files for broadening the scope of the Printed Book or other printed materials contents, not limited to that conversion only, any recorded audio materials such as seminar speaker or sermon presented live or in television/radio with publication right from the owner for paid or free can be converted also to Micro-Book™; and wherein the user engages the digital audio player, a digital video player, the audio speaker, and the external display screen to simultaneously listen to Micro-Book™ through the audio speaker and read the video, image, and text files on the display screen. This kind of creation of Micro-Book™ in the form of a MicroSD card that is produced and readily available in the bookstores for users who do not have any knowledge of technology like young children and elderly, and creates eco-friendly awareness. Furthermore, the device will provide the general public or blind users with convenience without having the complexities of uploading/downloading files to a computer, smartphone, tablet, mp3/mp4 player, or CD (Compact Disc).

In embodiments of the subject invention, the ring band is worn on the index or middle finger of a user.

In embodiments of the subject invention, the display screen on the housing comprises an LED or LCD screen.

In embodiments of the subject invention, the ring band is swiveled in a clockwise direction or a counter-clockwise direction on a user's finger.

In embodiments of the subject invention, the plurality of toggle buttons are operated by one thumb of the user on the same hand as the finger wearing the ring.

In embodiments of the subject invention, the radio antenna of the housing wirelessly transmits and is connected to external radio receivers selected from the group consisting of: speakers, ear plugs, computers, mobile phones, and mobile tablets.

In embodiments of the subject invention, the plurality of toggle buttons permit the user to make four separate, simultaneous counts with the four digital tally counters.

In embodiments of the subject invention, the plurality of toggle buttons permit the user to make four separate, simultaneous counts with the four digital tally counters conjointly with the laser light as a pointer to do counting goods for inventory from a distance.

In embodiments of the subject invention, the plurality of toggle buttons permit the user to make four separate, simultaneous counts with the four digital tally counters while listening to an audio file through the speaker.

In embodiments of the subject invention, the display screen turns red and blue colors for odd counting numbers and even counting numbers respectively when using the digital tally counters.

In embodiments of the subject invention, the learning device comprises executable voice recognition with noise cancellation software that allows the microphone to record a user's voice over a previously recorded audio file, while substantially cancelling out the sound that he/she previously recorded audio file, and substantially maintaining the user's voice.

In embodiments of the subject invention, the learning device comprises executable speech recognition with translation software that allows the microphone to detect a voice and automatically translate the detected voice into another language chosen by the user.

In embodiments of the subject invention, the plurality of toggle buttons permit the user to make four separate, simultaneous counts with the four digital tally counters for the main purpose to count in four separate segments to do a more thorough data collection like traffic survey for cars, motorcycles, bicycles, and buses.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of embodiments thereof, which description should be considered in conjunction with the accompanying drawings, in which.

DETAILED DESCRIPTION OF THE EMBODIMENTS

While several variations of the present invention have been illustrated by way of example in particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Figure 1:
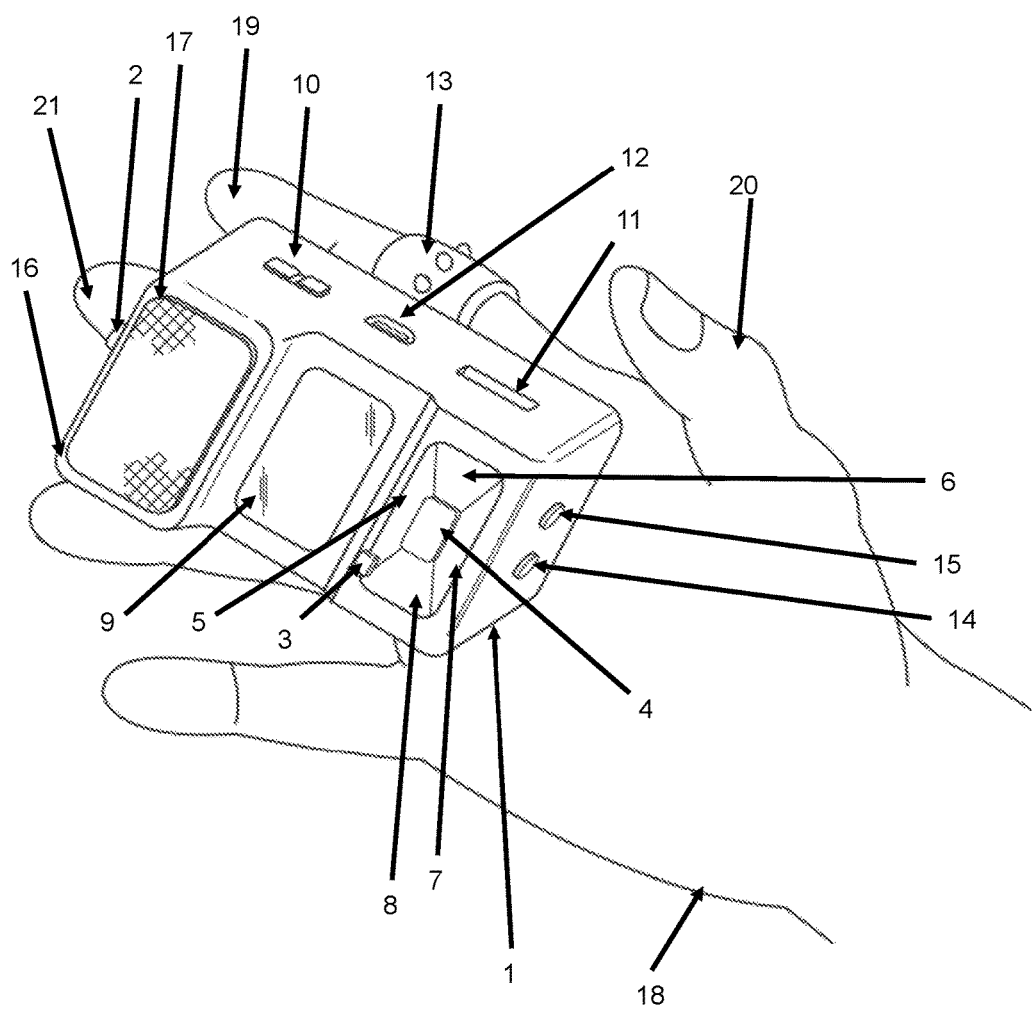
FIG. 1 illustrates a left side perspective view of the learning device attached to a user's hand.
Figure 2:
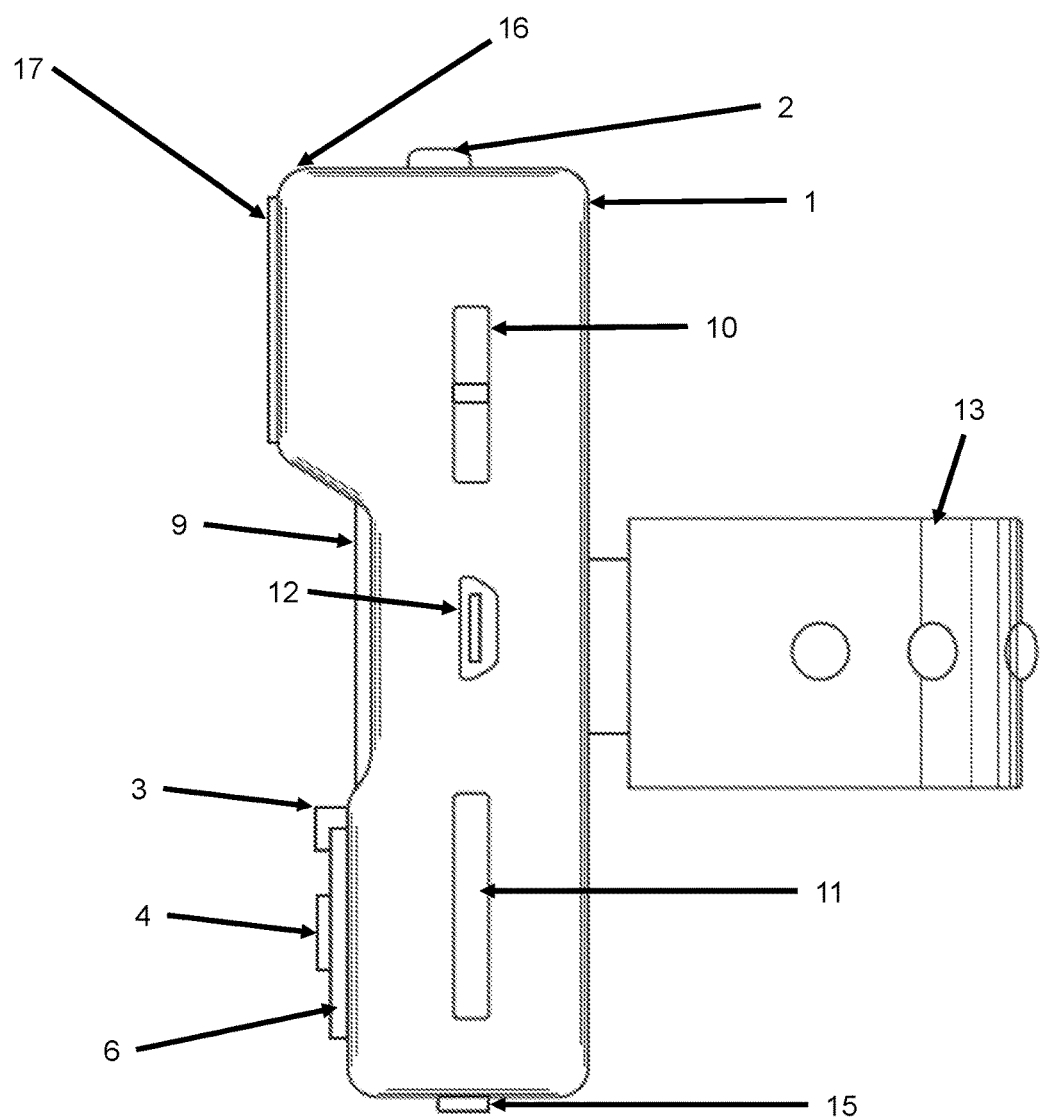
FIG. 2 illustrates is a left side view of the learning device.
Figure 3:
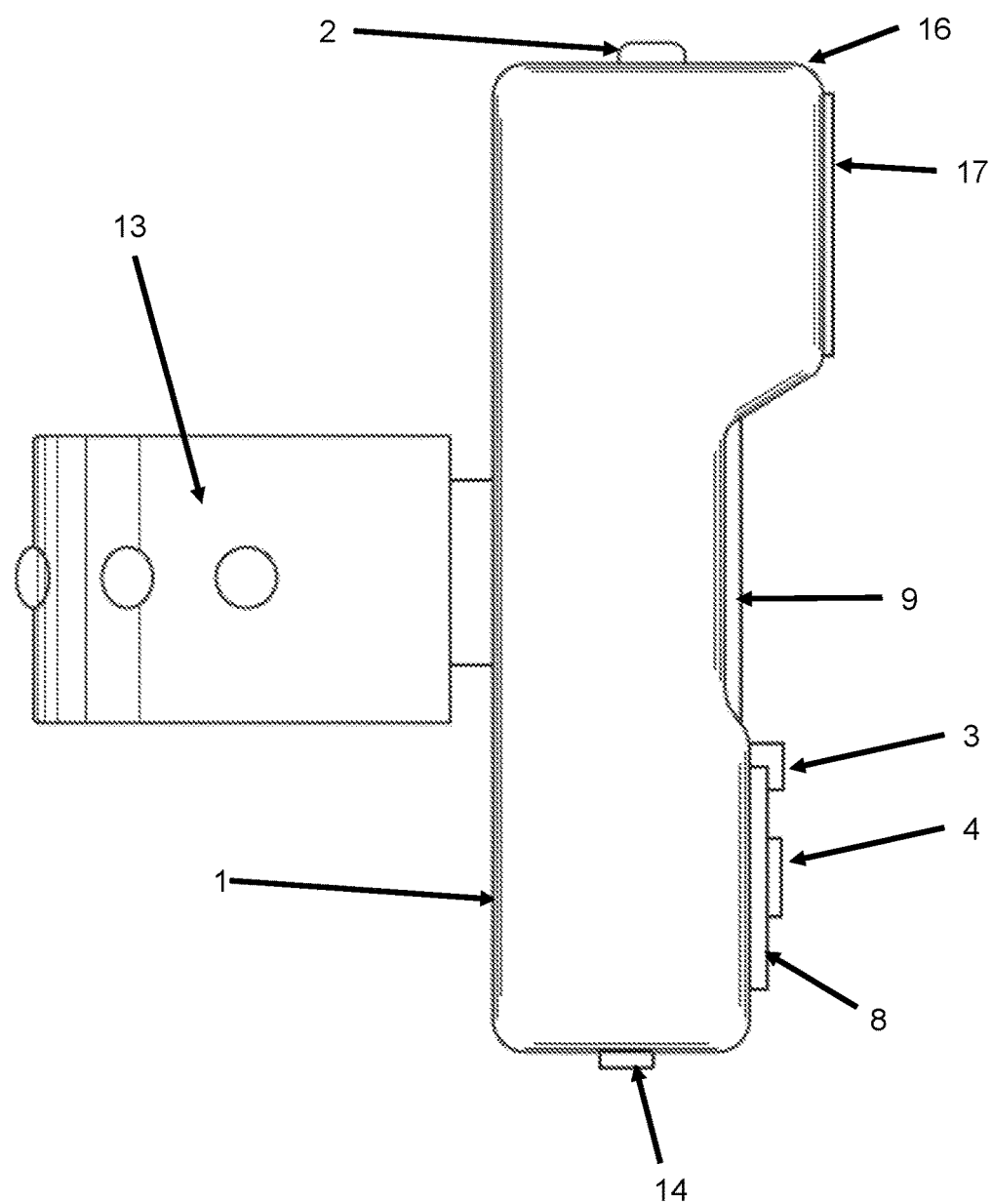
FIG. 3 illustrates is a right side view of the learning device.
Figure 4:
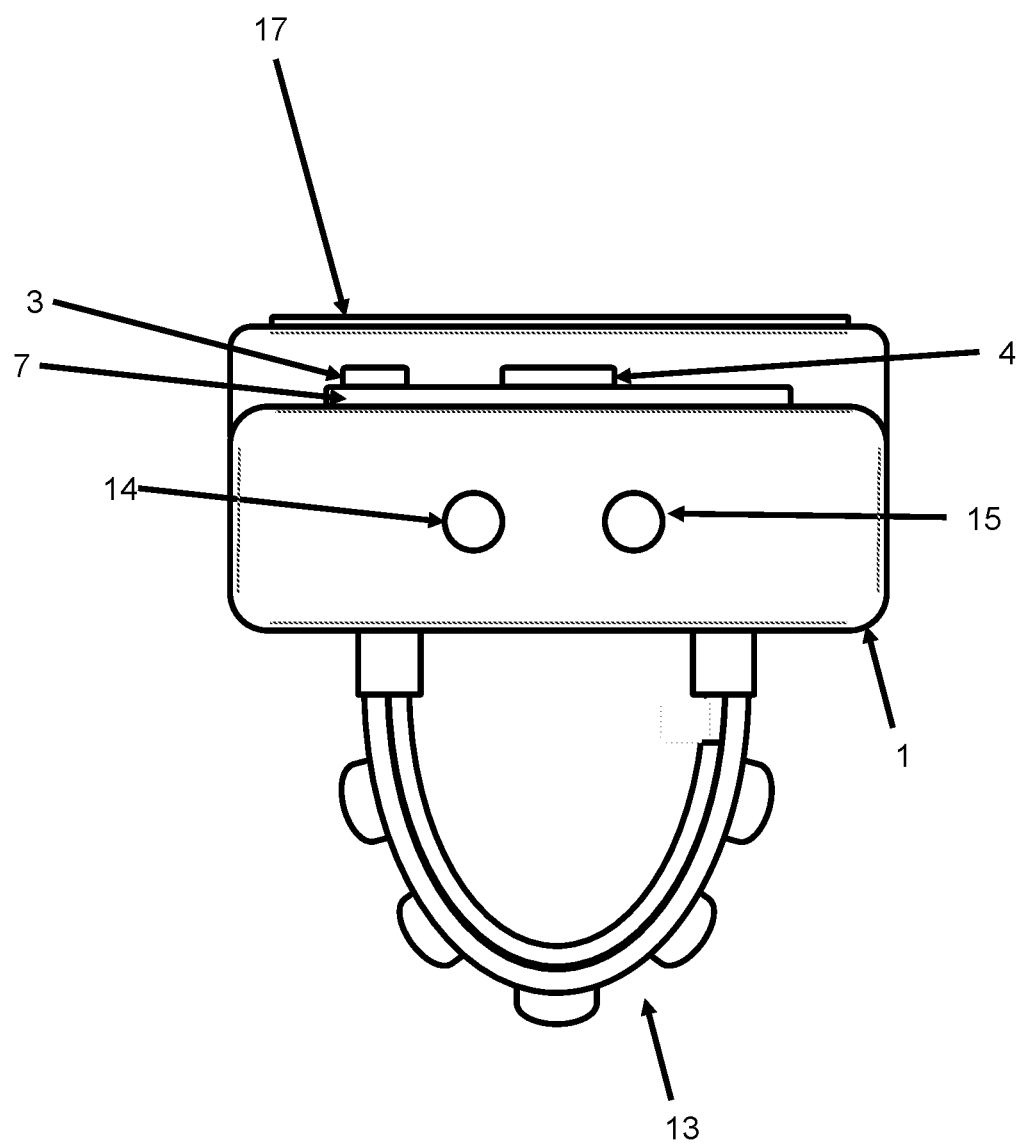
FIG. 4 illustrates is a bottom side view of the learning device.
Figure 5:
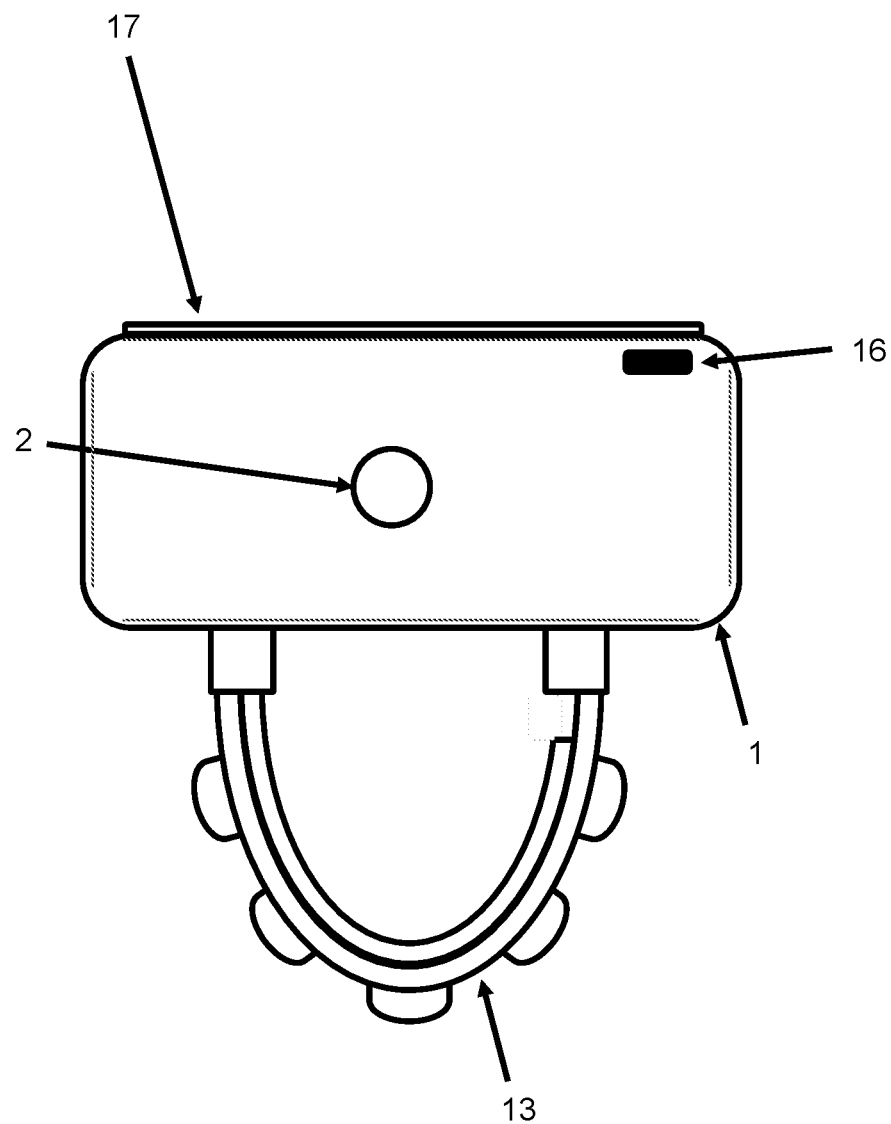
FIG. 5 illustrates is a top side view of the learning device.
Figure 6:
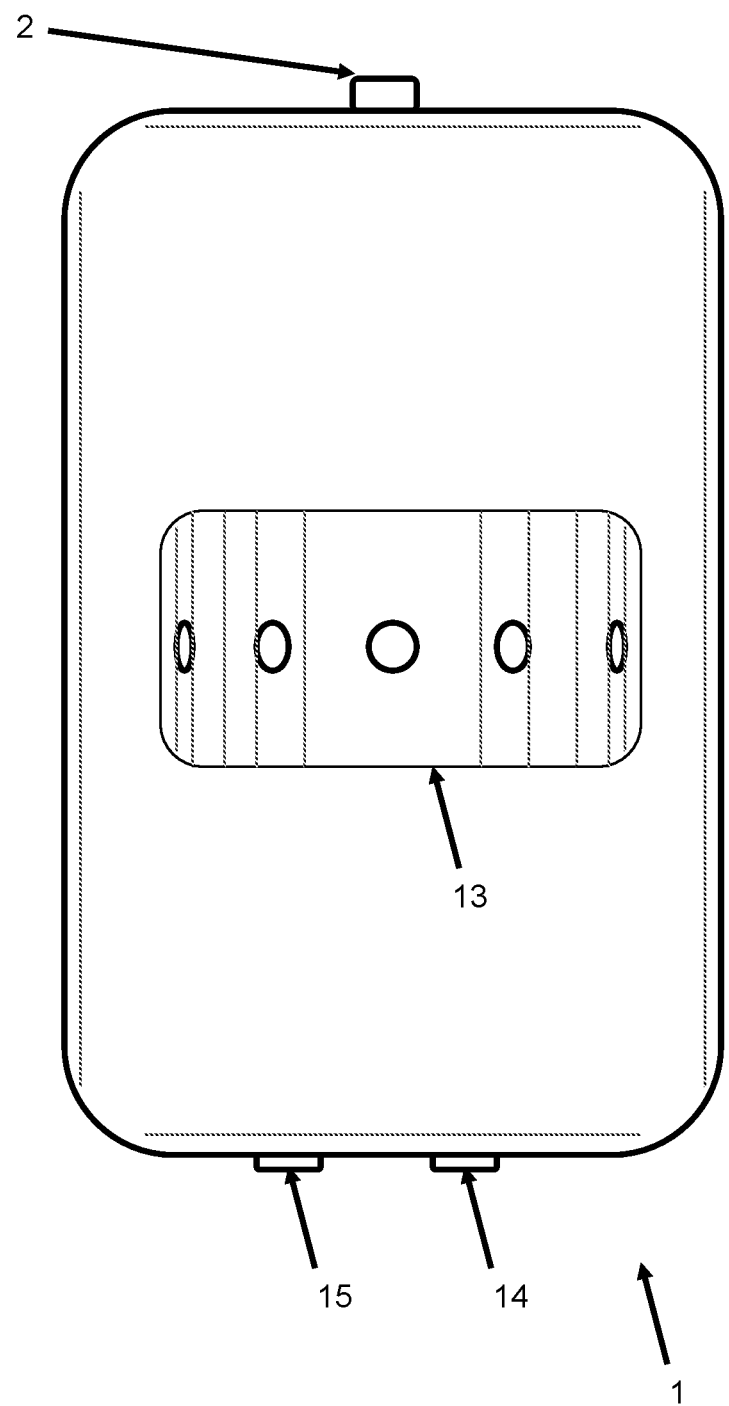
FIG. 6 illustrates is a rear side view of the learning device.

As illustrated in FIGS. 1-6, the subject invention is a device 1 attached to an adjustable and swivel ring band 13 that may be worn on the index finger 19 or middle finger 21 of a user's hand 18. The subject invention incorporates an innovative method of learning by encouraging a user to study any type of subject by way of recording, listening, reviewing, and repeating what is being studied, entitled the Fix-Smart™. Furthermore, a user may incorporate this device 1 into religious practices. The subject invention contains digital tally counters keeping track of short prayers which are recited repetitively. The subject invention will allow a user to obtain good habits for learning activities, religious activities, and counting activities since the small device 1 is always available on the user's hand 18. The device 1 is not lost easily, is convenient to carry around everywhere, and is ready to use at any time.

The device 1 comprises a housing attached to an adjustable ring band 13. In embodiments of the subject invention, the ring band 13 may be composed of "negative ions" for health benefits. The ring band 13 is placed onto a user's index finger 19 or middle finger 21 of a user's hand 18. The ring band 13 can be adjusted and swiveled clockwise or counter-clockwise to permit easy operation of the device 1 with a thumb 20. The device 1 is very simple to use with an easy menu display and a few buttons only, and most importantly, it is physically operated with one thumb 20 only, as such the user's hands are free to do other activities without any obstructions. Because the device 1 is always attached on a finger with two hands free, it is very convenient to be carried everywhere for any activities. This permits a user to study, practice or pray anywhere, at any time.

The top of the device 1 contains an On/Off button 2. The button 2, can be pushed to turn the device 1 on and off through activation of an internal battery (not shown). The button 2 may further be placed in a locked position to prevent the operation of any other buttons on the device 1 to prevent interruption of a current active operation. The device 1 may further contain auto turn off function after 3 minutes when idle to conserve internal battery life. In further embodiments of the subject invention, the device 1 may require additional biometric information to be turned on including, but not limited to: a fingerprint, a thumbprint, or a voice sample.

The front of the device 1 contains a built-in speaker 17 where its body is extended outward to create an empty space inside for echoing and absorption such that the output will sound crisp and clear. The top left side part of device 1, there is contains a volume control +/− button 10, where the "+" portion of the button 10 can be toggled for increasing volume, and "−" portion of the button 10 can be toggled for decreasing volume from the built-in speaker 17. To magnify the sound from the built-in speaker 17, the device 1 has an internal Bluetooth antenna which can be wirelessly connected to external speakers, ear plugs, computers, mobile phones, or tablets.

The middle left side part of device 1 contains a USB connection port 12 that can be connected to a computing device with USB cable for copying files, and recharging the internal battery. In remote areas, the internal battery is rechargeable with a portable solar charger. In embodiments of the subject invention, after recharging, the internal battery can last up to 8 hours for continuous usage. The bottom left side part of device 1 contains a MicroSD slot 11 for inserting a MicroSD external memory card that is used to save all the recorded files, audiobook files, podcast files, music files, or any other audio, video, image, text, and data files.

Additional audio, video, image, text, and data files may be downloaded from the Internet in three ways. A MicroSD card may be removed from device 1 and inserted into a computer. Additional audio, video, image, text, and data files may then be dragged and copied to each folder on the MicroSD card. The MicroSD card is then re-inserted into MicroSD slot 11. Audio, video, image, text, and data files may also be downloaded onto the device 1 through the USB connecting port 12 with a USB cable, or wirelessly through Bluetooth activation. These files may be downloaded from Internet and can cover any subject for studying and religious practices. The device 1 software or files may be downloaded or accessed through on-line portals or downloadable software applications on personal computers, laptop computers, smartphones, tablet devices, or other computer workstations connected to the Internet through a wired or wireless connection such as Wifi or Bluetooth.

The device 1 may include communication devices (such as a bus), a CPU/processor, a main operating memory, and a storage memory. Embodiments of the CPU/processor may include processors, microprocessors, multi-core processors, microcontrollers, system-on-chips, field programmable gate arrays (FPGA), application specific integrated circuits (ASIC), application specific instruction-set processors (ASIP), or graphics processing units (GPU). The device 1 stores computer retrievable information and software executable instructions and may include solid state, magnetic, or optical recording mediums. The underlying architecture of the device 1 may be implemented using one or more custom computer programs, each of which may execute under the control of an operating system, such as Windows, OS2, DOS, AIX, LINUX, UNIX, MAC OS, iOS, ChromeOS, Android, and Windows Phone or CE.

The bottom part of device 1 contains a torch light 14 for reading at night or in the dark; and a laser light 15 for use as a presentation pointer, or counting goods for inventory from a distance with the digital tally counter.

The middle front part of device 1 contains color display 9, such as an LED or LCD for displaying a main menu user interface screen, a sub-menu user interface screens that display icons of files that can be chosen and activated with the user's thumb by toggling the buttons of the front of the device 1:

Back button 3;
Select button 4;
Play/Pause/Scroll-up/Counter-1 button 5;
Right/Next/Forward/Counter-2 button 6;
Scroll-down/Option/Counter-3 button 7; or
Left/Previous/Rewind/Counter-4 button 8.

When the device 1 is turned on with button 2, the display 9 will display a main menu user interface screen that contains selectable icons for Books, Religion, Voice, Emotional Quotient, Music, Radio, Digital Tally Counter, MicroSD Card, and Settings. A user may select one of these icons by toggling button 6 to move to the right, or toggling button 8 to move to the left. Once an icon is highlighted on the display 9, a user may select this folder/sub-menu by pushing button 4. Within each sub menu, a user may select any sub-folders by toggling button 5 to move up, or toggling button 7 to move down. To go back to a previous menu or sub-menu, the user may toggle back button 3.

A user may select one of these previously recorded audio files, such as books, prayers, lectures, music radio, by toggling button 5 to move up, or toggling button 7 to move down. Once a recorded audio file is highlighted on the display 9, a user may select this file by pushing button 4. While listening to an audio file, a user can push button 7 to choose the options of playback speed or deleting the file. For option of playback speed, a user can toggle button 4 to select a playback speed between normal, fast, or slow. For option delete, a user can toggle button 4 to have an option Yes or No. A user that keeps pressing button 6 or Forward will speed forward the sound that is being listened, and a user that keeps pressing button 8 or Rewind will speed backward the sound that is being listened. The device 1 may also permit a user to continue listening to an audio file from the last point accessed.

The sub-menu of the Books icon on the main menu user interface screen, may contain files of audiobooks and broadcasts in the digital audio format. Each file may be labeled with titles, which may further have sub-menus of chapters that may be selected.

The sub-menu of the Religion icon on the main menu user interface screen, may contain a sub-menu of Islam, Christianity, Buddhism/Tripitaka, and Hinduism/Veda.

The Islam icon may contain further icons of Al-Quran, Salah Procedure Guide, Asmaul Husna, and Pray. The Al-Quran icon may contain Qari Indonesia and Qari Middle East that can be selected in which there are names whom can be chosen for their quickness, slowness, and sonorities. After selecting one of them, they contain 30 Juz including Surah and Ayah, which can be chosen and activated for listening. The Salah Procedure Guide icon may contain Qari Indonesia and Qari Middle East that can be selected in which there are names whom can be chosen for their quickness, slowness, and sonorities. After selecting one of them, they contain Juz 'Amma with the options of Memorize or Salah. The icon Memorize has contents of list of Surah that can be selected and once activated, will emit recitation of that Surah over and over again to be memorized. The icon Salah has contents of Rakat 1 (ritual movements and words), Rakat 2, Salah Wajib, and Salah Sunnah. Inside the icons of Rakat 1 and Rakat 2, the user can select list of Surah that can be used for Salah, after making the selection of one or more Surah, then can go back to the sub menu previously by pressing button 3, and select Salah Wajib or Salah Sunnah. The Salah Wajib icon contains Fajr, Zuhr, Asr, Maghrib, and Isha. The Salah Sunnah icon contains Duha, Tahajjud, Taubat, Witr, Tahiyyatul Masjid, Qabliyah, Ba'diyyah, Istikharah, Hajat, Mutlaq, Tasbih, and Tarawih. A beginning user may conduct Salah alone by following the Salah procedure recitations which have been pre-programmed in the device 1. The more often a user conducts Salah, the user will encounter faster success. The Asmaul Husna icon comprises of 99 Names of ALLAH which can be chosen and activate, where each of them has meaning and benefit with a certain total of number when doing Dhikr by using the digital tally counter. The Pray icon contains Wudu (Ablution) Prayer, Before Salah Prayer, Junub (Ritually Impure) Prayer, Enter/Exit Mosque Prayer, For Parents Prayer, Safety Prayer, Before/After Eating Prayer, Wake Up/Before Sleeping Prayer, Enter/Exit House Prayer, World-Hereafter Kindness Prayer, Protect from Torment of Hell Prayer, and Sufficient/Protect Prayer.

The Christianity icon contains Bible and Pray icons. The Bible icon comprises languages of English, Bahasa Indonesia, Mandarin, Arabic, Spanish, Hindi, Portuguese, Urdu, Russian, Japanese, France, and Bangla, wherein in every language there is an icon selection of New American Standard, New International Version, Revised Standard Version, and New King James Version Bibles. If one of these Bibles is selected, there will be icons for a Book of the Old Testament and a Book of the New Testament, containing the Book of Names. In the Book of Names icon there are Chapters along with the Verses which can be chosen and activated for listening. The Pray icon contains The Lord's Prayer (Mathew 6:9-13), The Prayers of Jabez (1 Chronicles 4:10), Jonah's Prayer of Salvation (Jonah 2:2-9), David's Prayer for Deliverance (Psalm 3), Hannah's Prayer of Praise (1 Samuel 2:1-10), Pray for Healing, Pray for Strength, and Morning Prayers, which can be chosen and activated for listening.

The Buddhism/Tripitaka icon contains the Vinaya Pitaka, Sutta Pitaka, and Abhidhamma Pitaka. The Vinaya Pitaka icon contains the Sutta Vibhanga, Khandhaka, and Parivara, that can be chosen and activated for listening. The Sutta Pitaka icon contains the Digha Nikaya, Majjhima Nikaya, Samyutta Nikaya, Anguttara Nikaya, and Khuddaka Nikaya, that can be chosen and activated for listening. The Abhidhamma Pitaka icon contains the Dhamma Sangani, Vibhanga, Puggala Pannatti, Dhatukatha, Yamaka, Patthana, and Kathavatthu, that can be chosen and activated for listening.

The Hinduism/Veda icon contains the Rigveda, Samaveda, Yajurveda, and Atharvaveda which can be selected. The Rigveda icon contains the 10 books that can be chosen and activated for listening. The Samaveda icon contains the 10 books and 75 mantras which can be chosen and activated for listening. The Yajurveda icon contains the Shukla and Krishna. The Shukla icon contains the Madhyandina and Kanva which can be chosen and activated for listening. The Krishna icon contains the Taittiriya, Maitrayani, Kathaka, and Kapisthala which can be chosen and activated for listening. The Atharvaveda icon contains the Paippalada, Danta, Pradanta, Snata, Snauta, Brahmadavala, Saunaka, Devadarsani, and Caranavidya, which can be chosen and activated for listening.

The Voice icon on the main menu contains a sub menu with Record, Play, Play/Record, and Translate icons for any of the audio files. When the Record icon is activated, the user can record any kind of sounds through the external microphone 16. To stop recording, the user can press button 4 which then displays a Save Recording icon. All recorded files are stored in the MicroSD card which is located inside the MicroSD slot 11. To listen to recorded sounds, the icon Play contains files labeled by name, date, and recording number. Each of these recording files can be chosen and activated for listening. Button 6 advances to the next recording, and button 8 goes back to the previous recording. By keep pressing button 6 or Forward will speed forward the sound is being listened, and keep pressing button 8 or Rewind will speed backward the sound is being listened. Moreover, by toggling button 5 to stop temporarily and continue playback the sound. While listening, the user can press button 7 to choose the options of playback speed or deleting the file. For option of playback speed, a user can toggle button 4 to select a playback speed between normal, fast, or slow. For option delete, a user can toggle button 4 to have an option Yes or No. In the Play/Record icon, there is a choice of files that have been copied or pre-recorded previously, which can be chosen and activated for listening and at the same time can be used to record the user's voice. In the Translate icon contains a list of languages can be chosen, once chosen is followed by Talk icon and Talk/Record icon. In Talk icon, the device 1 will automatically translate the words spoken, whereas in Talk/Record icon, the device 1 will automatically translate and record the words spoken, and sound through the built-in speaker 17.

In embodiments of the subject invention, the device 1 may contain voice recognition with noise cancellation software that has the ability to analyze and distinguish between sounds captured by microphone 16 and sounds played back on the built-in speaker 17. This function is useful for making audio notes by recording a user's voice over important points during playback of audio files for lectures, books, sermons, or other. This function is useful for practicing singing rehearsals and presentation rehearsals in order to correct the notes or pronunciations. For religious learning purposes, this function permits a user to playback a previously recorded Salah, and imitate those movements by listening and vocalizing that previously recorded Salah to correct any mistakes.

In embodiments of the subject invention, the device 1 may contain speech recognition and translation software that detects and captures words spoken into microphone 16 and then automatically translates them into a language chosen by the user. The device 1 may have a choice of languages such as English, Bahasa Indonesia, Mandarin, Arabic, Spanish, Hindi, Portuguese, Urdu, Russian, Japanese, France, and Bangla. Once the words are spoken, translated, and recorded, the device 1 permits a user to playback the translated audio file.

The Emotional Quotient icon of the main menu contains icons for Wisdom, Positive Thinking, Self-Awareness, Self-Control, Motivation, Character, Humor, and Meditation. The Wisdom icon contains wise words that can be chosen and activated for listening and practicing. The Positive Thinking, Self-Awareness and Self-Control icon contains methods on these topics that that can be chosen and activated for listening. The Motivation icon contains stories of successful people or words of motivation which can be chosen and activated for listening. The Character icon contains audio files on courtesy, understanding, and mutual respect, which can be chosen and activated for listening. The Humor icon contains jokes which can be chosen and activated for listening. The Meditation icon contains Meditation Guides and Tranquil Music.

The Music icon contains icons for Shuffle, Artist, Album, and Song. When the Shuffle icon is activated, all the songs will be played randomly. The Artist icon consists of Play All and the singer names whose can be chosen and activated for listening. The Album icon contains album titles which can be chosen and activated for listening. The Song icon contains Play All and song titles in alphabetical order which can be chosen and activated for listening. A user can press button 6 to advance to the next song, and press button 8 to go to the previous song. A user that keeps pressing button 6 or Forward will speed forward the sound that is being listened, and a user that keeps pressing button 8 or Rewind will speed backward the sound that is being listened.

The Radio icon, when activated, will automatically tune to an FM station. The user can press button 6 to tune to the right and press button 8 to tune to the left. By pressing button 7, there is an Auto Preset function that will automatically scan through radio stations to tune in to a working channel.

The Digital Tally Counter icon contains icons for New Count, Count Now, Save Log, and Delete Log. The New Count icon allows the user to toggle button 5 to count as a first digital tally counter, toggle button 6 to count as a second digital tally counter, toggle button 7 to count as a third digital tally counter, and toggle the button 8 to count as a fourth digital tally counter, where all of counters are displayed on display 9 with five digits from 00000 to 99999.

The device 1 permits a user the ability to count numbers in four different segments for a more thorough data collection. For example, the device 1 can count the number of visitors at a venue or location by their gender and age by separately counting men, women, boys, and girls. In another example, the device 1 can count the number of vehicles at a venue or location by their type by separately counting cars, motorcycles, bicycles, and buses. Furthermore, the device 1 permits a user to set the four digital tally counters to count certain target numbers practice formulas, sentences, or words in study.

The device 1 also permits counting in groups. For example, for counting in groups of 33, the user can toggle button 5 from 00000 to 00033, then the user can press and hold button 5 until a long beeping sound emits from device 1, which indicates that the counter is ready to count in groups of 33. The five digit display that is 00000 will automatically convert to 00-000 with the first two digits for group counting and latter three digits for counting. The device 1 may give a quick beeping sound for every group counting increments. In addition, the display 9 may contain a backlight that turns from red for odd counting numbers to blue for even counting numbers. This process is very helpful when used to conduct Salah when counting Rakat, in which the user can look to this device 1 to find out what counting number, or, can glance (without head movements) to the red or blue backlighting to find out whether the counting in odd or even so as not to forget or be mistaken.

The Count Now icon continues counting number previously in progress. The New Count icon starts a counting number from the beginning (reset) and at the same time the counting data from the previous count are stored in the Save Log icon. The Save Log icon contains counting data based on the number and the date. Each of these data files display counting data based on date, beginning time, ending time, and average time during count. In embodiments of the subject invention, the device 1 may be pre-programmed detailed counting data for laboratory work, manufacturing, paleontology, planetology, or others.

A Delete Log icon contains the number and date of the counting data saved, if one of them is chosen then that counting data will be deleted.

The MicroSD Card icon contains icons for Play File, Play/Record File, Talk/Record File, Audiobook File, Podcast File, and Book Conversion. The Play File, Play/Record File, and Talk/Record File icons contain audio recordings organized by date and recording number. The Audiobook File and Podcast File icons contain audiobook files and broadcast files that can be chosen and activated for listening. The Book Conversion icon contains audio files from a Printed Book that is converted by means of a book scanner or text-to-speech software.

In embodiments of the subject invention, to provide a value-added breakthrough by creating a new mind set for the author or publisher who is generally producing a manuscript in a Printed Book, e-book, audiobook, mp3, or CD forms to start producing in a MicroSD card form or so called Micro-Book™. Micro-Book™ is almost similarly produced like the audiobook where the manuscript is narrated in a recording studio by professional or celebrity narrators with the exception where the video, image, and text files can be added to broaden the scope of the contents to give a better understanding for younger users. The Micro-Book™ can be mass produced by duplicating the master copy of Micro-Book™ and can be write protected to protect the copyright of the author. A Micro-Book™ with memory sizes of 1 to several GB is large enough to hold large audio and video files and is very inexpensive to produce compared to a Printed Book.

A user can put the Micro-Book™ into the slot in device 1. The user can then listen to the audio files instantly without having to know any knowledge and use of a computer or Internet where is very useful for young children and elderly, and very convenient for the blinds. In other words, after purchasing a Micro-Book™, a user can plug-in the Micro-Book™ to this learning device 1 in the slot and can listen to the contents of the book immediately while doing other activities like doing housework or commuting to work without having to read the book on his or her spare time. For instance as one of the advantages, rather than having to purchase the motivational speech and spiritual sermon materials in a CD for listening most likely in the car, with this innovative way, the user can purchase those materials in a Micro-Book™ which can be listened anywhere and at any time. In tandem with the Printed Book, will be very beneficial for a young child who is in the process of learning to read can enhance and rectify his or her learning capability by listening and reading (at the same time) the story books of his or her liking by himself or herself without having to wait for any assistance from his or her teacher or parents to read for him or her first where can lessen the pressure of learning, on the contrary, will make learning to read more exciting and enjoyable. A Micro-Book™ can be made in various languages. The Micro-Book™ avoids the large waste and environmental problems of Printed Book.

The Settings icon contains icons for Language, Customize, Date, Time, Bluetooth, Light, and Format. In the Language icon, there are language options such as English, Bahasa Indonesia, Mandarin, Arabic, Spanish, Hindi, Portuguese, Urdu, Russian, Japanese, France, and Bangla; if one of them is chosen, then the device 1 with display that language. In the Customize icon, there are icons of Books On, Religion On, Voice On, Emotional Quotient On, Music On, Radio On, Digital Tally Counter On, MicroSD Card On; if one of them is selected, will make that icon Off or no longer appear in the main menu screen. The Date and Time icons permit the date and time of the device 1 to be set. The Bluetooth icon activates the internal Bluetooth antenna of the device 1. The Light icon will permit the torch light 14 or laser light 15 to be activated and deactivated. The Format icon allows a user to format the internal memory to restore the factory settings or to format a MicroSD card within the device 1.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed here.

What is claimed is:

1. A wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen by the executable software, wherein each user interface screen displays menu icons; a plurality of toggle buttons on the housing for moving and selecting the displayed menu icons on the plurality of user interface screens, wherein selection of one of the displayed menu icons activates the executable software to control one or more of the microphone, the digital voice recorder, the digital audio player, the digital video player, the audio speaker, the wireless internet antenna, the radio antenna, the memory card inserted into the slot, the four digital tally counters, the torch light, and the laser light; wherein the plurality of toggle buttons are operated by one hand of the user; further wherein the user engages the microphone, the digital voice recorder, the digital audio player, the audio speaker; and wherein the user engages the digital audio player and the audio speaker to listen to audio files.

2. The device of claim 1, wherein the ring band is worn on the index finger of the user.

3. The device of claim 1, wherein the ring band is worn on the middle finger of the user.

4. The device of claim 1, wherein the display screen on the housing is an LED screen.

5. The device of claim 1, wherein the display screen on the housing is an LCD screen.

6. The device of claim 1, wherein the ring band is configured to swivel in a clockwise direction on the user's finger.

7. The device of claim 1, wherein the ring band is configured to swivel in a counter-clockwise direction on the user's finger.

8. The device of claim 1, wherein the plurality of toggle buttons are operated by one thumb of the user on the same hand as the finger wearing the ring band.

9. The device of claim 1, wherein the radio antenna of the housing wirelessly transmits and is connected to external radio receivers selected from the group consisting of: speakers, ear plugs, computers, mobile phones, and mobile tablets.

10. The device of claim 1, wherein the plurality of toggle buttons permit the user to make four separate, simultaneous counts with the four digital tally counters.

11. The device of claim 1, wherein the plurality of toggle buttons permit the user to make four separate, simultaneous counts with the four digital tally counters conjointly with the laser light as a pointer to do counting goods for inventory from a distance.

12. The device of claim 1, wherein the display screen turns red for odd counting numbers and turns blue for even counting numbers when using the digital tally counters.

13. The device of claim 1, wherein the display screen further comprises a five digit numerical display for use with the four digital tally counters, wherein, in response to the user operating one of the plurality of toggle buttons, the five digit numerical display automatically converts to a five digit format of 00-000 with the first two digits displaying a group count, and the latter three digits displaying a count.

14. A wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen by the executable software, wherein each user interface screen displays menu icons; a plurality of toggle buttons on the housing for moving and selecting the displayed menu icons on the plurality of user interface screens, wherein selection of one of the displayed menu icons activates the executable software to control one or more of the microphone, the digital voice recorder, the digital audio player, the digital video player, the audio speaker, the wireless internet antenna, the radio antenna, the memory card inserted into the slot, the four digital tally counters, the torch light, and the laser light; wherein the plurality of toggle buttons are operated by one hand of the user; further wherein the user engages the microphone, the digital voice recorder, the digital audio player, the audio speaker; and wherein the user engages the digital audio player and the audio speaker to listen to audio files.

15. A wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen by the executable software, wherein each user interface screen displays menu icons; a plurality of toggle buttons on the housing for moving and selecting the displayed menu icons on the plurality of user interface screen, wherein selection of one of the displayed menu icons activates the executable software to control one or more of the microphone, the digital voice recorder, the digital audio player, the digital video player, the audio speaker, the wireless internet antenna, the radio antenna, the memory card inserted into the slot, the four digital tally counters, the torch light, and the laser light; wherein the plurality of toggle buttons are operated by one hand of the user; further wherein the audio, video, image, text, and data files are downloaded through on-line portals on a computing device connected to the Internet through a wired or wireless connection.

16. A wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screens generated on the display screen by the executable software, wherein each user interface screen displays menu icons; a plurality of toggle buttons on the housing for moving and selecting the displayed menu icons on the plurality of user interface screens, wherein selection of one of the displayed menu icons activates the executable software to control one or more of the microphone, the digital voice recorder, the digital audio player, the digital video player, the audio speaker, the wireless internet antenna, the radio antenna, the memory card inserted into the slot, the four digital tally counters, the torch light, and the laser light; wherein the plurality of toggle buttons are operated by one hand of the user; further wherein the user inserts an audio book in the memory card, wherein the audio book is produced by converting any printed or recorded audio materials into an audio file component by utilizing a narrator and combined with video, image, and text files; and wherein the user engages the digital audio player, a digital video player, the audio speaker, and the external display screen to simultaneously listen to the audio book through the audio speaker and display the video, image, and text files on the display screen.

17. A wearable learning device, comprising: a housing comprising an external display screen, a microphone, a digital voice recorder, a digital audio player, a digital video player, at least one audio speaker, a volume control button, a wireless internet antenna, a radio antenna, a slot for receiving a memory card, four digital tally counters, a torch light, and a laser light; a computing device comprising executable software within the housing; a data storage device within the housing, comprising a database of audio, video, image, text, and data files; an adjustable and swivel ring band attached to the housing, wherein the ring band is worn on a finger of a user; a battery within the housing operatively connected to an external power button; a plurality of user interface screen generated on the display screen by the executable software, wherein each user interface screen displays menu icons; a plurality of toggle buttons on the housing for moving and selecting the displayed menu icons on the plurality of user interface screens, wherein selection of one of the displayed menu icons activates the executable software to control one or more of the microphone, the digital voice recorder, the digital audio player, the digital video player, the audio speaker, the wireless internet antenna, the radio antenna, the memory card inserted into the slot, the four digital tally counters, the torch light, and the laser light; and wherein the plurality of toggle buttons are operated by one hand of the user.

* * * * *